United States Patent [19]

Noetzel et al.

[11] 4,036,811
[45] July 19, 1977

[54] FLAME RETARDING POLYAMIDE MOLDING COMPOSITIONS

[75] Inventors: Siegfried Noetzel, Kelkheim, Taunus; Walter Herwig, Neuenhain, Taunus, both of Germany

[73] Assignee: Hoechst Aktiengesellschaft, Frankfurt am Main, Germany

[21] Appl. No.: 620,141

[22] Filed: Oct. 6, 1975

[30] Foreign Application Priority Data

Oct. 7, 1974 Germany .............................. 2447727

[51] Int. Cl.² ............................................. C08K 5/53
[52] U.S. Cl. ....................... 260/45.75 W; 260/45.7 P
[58] Field of Search .................. 260/45.75 W, 45.7 P, 260/78 S, 45.75, 45.7

[56] References Cited

U.S. PATENT DOCUMENTS

| | | | |
|---|---|---|---|
| 2,981,715 | 4/1961 | Ben ................................... | 260/45.7 P |
| 3,454,412 | 7/1969 | Stokes ............................... | 260/45.95 |
| 3,471,552 | 10/1969 | Budnick ........................... | 260/45.7 P |
| 3,582,510 | 6/1971 | Cannelongo ..................... | 260/45.7 P |
| 3,786,114 | 1/1974 | Jaquiss et al. ................... | 260/45.75 W |
| 3,894,986 | 7/1975 | Racky et al. ..................... | 260/45.7 P |
| 3,900,444 | 8/1975 | Racky et al. ..................... | 260/45.7 P |

*Primary Examiner*—V.P. Hoke
*Attorney, Agent, or Firm*—Curtis, Morris & Safford

[57] ABSTRACT

There are disclosed novel flame retarding polyamide molding compositions containing, as the flameproofing agents, an amount of from 6 to 40, preferably 8 to 30 weight % of an alkali metal or a group II or III metal salt of a phosphinic or diphosphinic acid. The flameproofing agents are thermostable and do not adversely affect the polyamides during preparation and processing.

7 Claims, No Drawings

FLAME RETARDING POLYAMIDE MOLDING COMPOSITIONS

The present invention relates to flame retarding polyamide molding compositions.

It is known that red phosphorus or carbon compounds of phosphorus may influence the flammability of polyamides, and that in certain cases they may have a good flame retarding effect.

The difficulty of using organo-phosphorus compounds for flameproofing polyamides resides in the fact that these compounds often have an insufficient stability under the manufacturing or processing conditions necessary for polyamides, that they are not chemically inert in certain cases, or that they have a too high vapor pressure and thus volatilize under thermal strain put on the polyamide, especially at reduced pressure.

It has now been found that polyamide molding compositions containing salts of phosphinic or diphosphinic acids of the formulae

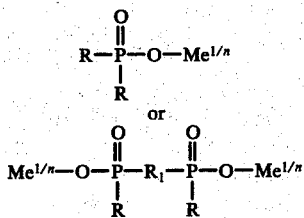

wherein
Me is an alkali metal or a metal of the second or third main or subgroup of the Periodic System,
n indicates the valency of the metal Me,
R represents identical or different saturated, open-chain, optionally also branched, or cyclic alkyl radicals having from 1 to 16, preferably from 1 to 6 carbon atoms, aryl or aralkyl radicals having from 6 to 16 carbon atoms, and
$R_1$ is a saturated, open-chain, optionally also branched, or cyclic alkylene, arylalkylene, arylene, arylene-alkylene or arene-bisalkylene radical having from 1 to 6, preferably from 2 to 4 carbon atoms in the alkylene radical,
have excellent flame-retarding properties and can be prepared without any difficulty.

The present invention provides polyamide molding compositions containing a flameproofing agent, wherein the flameproofing agent is a salt of a phosphinic acid of the formula

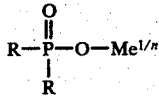

or a diphosphinic acid of the formula

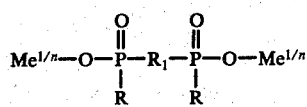

wherein
Me is an alkali metal or a metal of the second or third main or subgroup of the Periodic System,
n indicates the valency of the metal Me,
R represents identical or different saturated, open-chain, optionally also branched, or cyclic alkyl radicals having from 1 to 16, preferably from 1 to 6 carbon atoms, aryl or aralkyl radicals having from 6 to 16 carbon atoms, and
$R_1$ is a saturated, open-chain, optionally also branched, or cyclic alkylene, arylalkylene, arylene, arylene-alkylene or arene-bisalkylene radical having from 1 to 6, preferably 2 to 4 carbon atoms in the alkylene radical.

Suitable phosphorus compounds contained in the polyamides according to the invention are for example the alkali, alkaline earth, magnesium, zinc and aluminum salts of dimethyl phosphinic, methylethylphosphinic, methylpropylphosphinic, methylhexylphosphinic, ethylphenylphosphinic, diethylphosphinic, ethane-1,2-dimethylphosphinic, ethane-1,2-diethylphosphinic, ethane-1,2-diphenylphosphinic and butane-1,4-dimethylphosphinic acid.

Especially preferred molding compositions of the invention are those containing zinc salts of phosphinic and diphosphinic acids of formulae I and II. The amount of salt of phosphinic or diphosphinic acid, depending on the polyamide and flameproofing requirements, is generally in a range of from 6 to 40, preferably from 8 to 30 weight %, calculated on the weight of the polymer.

As polyamides which in combination with the metal salts of the phosphinic acids of formulae I and II yield the molding compositions of the invention, there are used above all amorphous polyamides which are derived for example from such main diamine components as 1,3- or 1,4-bis(aminomethyl)-cyclohexane, 2,5- or 2,6-bis(aminomethyl)-bicyclo-[2,2,1]-heptane, dimethyl-bis(4-aminocyclohexyl)-methane, 2,2,4- or 2,4,4-trimethylhexamethylene-diamine or xylylene-diamine.

The polyamides are derived for example from
i. from 5 to 50 mol %, preferably from 10 to 35 mol %, of 1,3-bis-(aminomethyl)-cyclohexane and/or 1,4-bis-(aminomethyl)-cyclohexane and/or 2,5-bis(aminomethyl)-bicyclo-[2,2,1]heptane and/or 2,6-bis-(aminomethyl)-bicyclo[2,2,1]heptane and/or at least one bis-(4-aminocyclohexyl)-derivative of an alkane having from 1 to 6 carbon atoms, preferably from 1 to 3 carbon atoms, and/or m-xylylene-diamine; up to 50 mol %, preferably up to 30 mol %, of the latter optionally being replaced by p-xylylene-diamine,
ii. from 0 to 45 mol %, preferably from 0 to 35 mol %, of at least one straight-chain or branched aliphatic diamine having from 40 to 20 carbon atoms, preferably from 6 to 12 carbon atoms, the amino groups being separated by at least 4 carbon atoms, preferably by at least 6 carbon atoms,
iii. from 5 to 50 mol %, preferably from 10 to 35 mol %, of at least one aromatic dicarboxylic acid having from 7 to 20 carbon atoms, preferably from 8 to 14 carbon atoms, especially a mononuclear aromatic m- or p-dicarboxylic acid,
iv. from 0 to 45 mol %, preferably from 0 to 35 mol %, of at least one saturated, straight-chain or branched aliphatic dicarboxylic acid having from 6 to 20 carbon atoms, preferably from 6 to 12 carbon atoms, the carboxyl groups being separated by at least 4 carbon atoms, and
v. from 0 to 80 mol %, preferably from 0 to 50 mol %, of at least one aliphatic amino-carboxylic acid having from 2 to 20 carbon atoms, preferably from 6 to 12 carbon atoms, especially an ω-amino-carboxylic acid, or itslactam, the mol % sum of components (i) and (ii) equaling the mol % sum of components (iii) and (iv), the mol % sum of all components (i), (ii), (iii), (iv) and (v) being 100, the mol % sum of components (i) and (iii) being from 20 to 95, preferably 50 to 90, the mol % sum of components (ii), (iv) and (v) being from 5 to 80, preferably from 10 to 50, and all the mol percentages being calculated on the sum of all components (i), (ii), (iii), (iv) and (v).

The polymaides to be used for the molding compositions of the invention may be prepared according to known processes. Diamine(s), dicarboxylic acid(s) and optionally aminocarboxylic acid(s) or its/their lactam(s) are introduced into an autoclave made of stainless steel, optionally with the addition of water. It is often convenient to prepare first a salt based on the starting components, this salt being then introduced into the steel autoclave, optionally with water. The contents of the autoclave are heated to approximately from 200° to 260° C while stirring. Steam is then discharged and the temperature increased to from 265° to 300° C. At this temperature condensation is continued in a nitrogen current, optionally under reduced pressure, until the polyamide has attained the desired molecular weight.

Polyamides with especially high molecular weights and good mechanical properties are obtained by submitting the polyamides prepared in the autoclave to condensation in a further processing step, preferably in a double screw extruder under reduced pressure.

The polyamides should have a reduced specific viscosity (RSV) — determined on a solution of 1 g of polyamide in 100 ml of phenol/tetrachloroethane (weight proportion 60:40) at 25° C — of from 0.7 dl/g to 3.0 dl/g, preferably from 0.9 to 2.8 dl/g.

The salts of the phosphinic acids of formulae I and II may be added to the starting polycondensation batch, or to the finished polyamide, as well as any time during the polycondensation. In case of adding the phosphinic acid salts to a finished polyamide, they are advantageously mixed with the granulated polyamide, and this mixture is either processed directly, for example on an injection molding machine, or first molten in an extruder, granulated and then processed after drying.

The flame retarding action of the phosphinic acid salts added is examined according to ASTM D 635-68 on test specimens having dimensions of 127 × 12.7 × 1.6 mm. The polyamide molding compositions of the invention are either self-extinguishing or non-flammable, depending on the concentration of the flameproofing agent. For example, a content of 20 weight % of the zinc salt of dimethylphosphinic acid in a polyamide obtained from 0.9 mol of terephthalic acid, 0.1 mol of isophthalic acid, 1.02 mols of 1,3-bisaminomethyl-cyclohexane, and 30 weight % of adipic acid-hexamethylene-diamine salt ensures sufficient flame retarding properties.

The phosphorus compounds contained in the flame retarding polyamide molding compositions of the invention are thermostable and do not adversely affect the polyamides either during their preparation or during their processing, and because of their salt characteristics, they are non-volatile under the preparation and processing conditions.

Besides the phosphinic acid salts, there may be added to the molding compositions of the invention also inorganic fiber materials in usual amounts, for example glass fibers, but also fibers of quartz, asbestos or carbon. The thickness of especially the glass fibers is advantageously in a range of from 0.1 to 50, preferably from 3 to 15, microns, and their length in a range of from 0.01 to 5, preferably from 0.05 to 1 mm. The amount of the fibers is advantageously up to 50, preferably from 10 to 30, weight %, relative to the molding compositions of the invention.

The polyamide molding compositions of the invention may also contain further additives, for example stabilizers, lubricants, dyestuffs, mold release agents, antistatics or fillers.

The flameproofed polyamide molding compositions of the invention are suitable for the manufacture of parts for engineering purposes, for example construction pieces for electric apparatus, parts of mechanical transmission in automatic machines and structural members in data processing systems.

The following examples illustrate the invention.

EXAMPLE 1a

A mixture of 66.4 g of terephthalic acid, 32.4 g of a bisaminomethylnorbornane mixture, 49.8 g of ε-caprolactam and 37.2 g of disodium salt of ethane-1,2-dimethylphosphinic acid was slowly heated to 275° C with agitation and under a nitrogen atmosphere. The water formed in the condensation was distilled off via a descending condenser. The reaction batch was maintained at 275° C for another hour, and subsequently, 178 g of solid polyamide were obtained.

The product cooled by dipping into liquid nitrogen was ground in a cross beater mill, dried for 5 hours under reduced pressure (less than 1 mm Hg) at 180° C, and compression molded at 235° C to plates having a thickness of 1.6 mm (RSV 1.34 dl/g). The test specimens (127 × 12.7 × 1.6 mm) obtained by sawing out were subjected to the combustion test according to ASTM D 635-68. The result of the test is indicated in Table 1.

EXAMPLE 1b (Comparative Example)

A polyamide of terephthalic acid, bisaminomethyl-norbornane mixture and ε-caprolactam was prepared as described in Example 1a, but without addition of the phosphinic acid salt, and tested according to ASTM D 635-68 (Table 1).

In order to prepare the bis-(aminomethyl)-norbornane mixture, 2-cyano-bicyclo[2,2,1]heptene-5 was hydroformylated. The reaction mixture was reacted with ammonia and hydrogen to form the bis-(aminomethyl)-norbornane mixture.

EXAMPLE 2

A mixture of 66.4 g of terephthalic acid, 58 g of 1,3-bisaminomethyl-cyclohexane (mainly present in the trans-form), 36.3 g of ε-caprolactam and 32.9 g of disodium salt of ethane-1,2-dimethylphosphinic acid was slowly heated to 275° C under a nitrogen atmosphere and with agitation. The water formed in the condensation was distilled off via a descending cooler. The reaction batch was maintained at 275° C for a further hour, and 152 g of solid polyamide were then obtained.

Test specimens were manufactured from the product in the manner described in Example 1a (RSV 1.02 dl/g), and subjected to the combustion test according to ASTM D 635-68. The result of the test is indicated in Table 1.

EXAMPLE 3a

A mixture of 149.5 g of terephthalic acid, 16.6 g of isophthalic acid, 145.1 g of 1,3-bisaminomethylcyclohexane, 116.7 g of adipic acid-hexamethylene-diamine salt (AH salt) and 93 g of zinc salt of dimethylphosphinic acid was heated slowly to 275° C in a nitrogen atmosphere and with agitation. Polycondensation occured, and the condensation water was distilled off via a descending cooler. The reaction batch was maintained at 275° C for a further hour. 391.5 g of solid polyamide having a milky white color were obtained.

According to the indications given in Example 1a, test specimens (RSV 0.98 dl/g) were manufactured and subjected to the combustion test according to ASTM D 635-68. The material was non-flammable, as indicated in Table 1.

EXAMPLE 3b (Comparative Example)

A polyamide was prepared according to Example 3a from terephthalic acid, isophthalic acid, 1,3-bisaminomethylcyclohexane and AH salt, but without addition of the phosphinic acid salt, and tested according to ASTM D 635-68 (Table 1).

EXAMPLE 4

As described in Example 3a, a polyamide was prepared in which 93 g of zinc salt of dimethylphosphinic acid were replaced by 96 g of disodium salt of ethane-1,2-dimethylphosphinic acid. The product obtained with a yield of 420 g was non-flammable according to the combustion test of ASTM D 635-68, as indicated in Table 1. RSV of the test specimens: 0.88 dl/g.

EXAMPLE 5

As described in Example 3a, a polyamide was prepared in which the zinc salt of dimethylphosphinic acid was replaced by the same amount of the zinc salt of ethane-1,2-dimethylphosphinic acid. 420 g of product were obtained. RSV of the compression molded plate: 0.92 dl/g. The test according to ASTM D 635-68 proved the non-flammability, as indicated in Table 1.

EXAMPLE 6

As described in Example 3a, a polyamide was prepared in which the zinc salt of dimethylphosphinic acid was replaced by 90 g of disodium salt of p-xylylene-dimethylphosphinic acid according to the formula

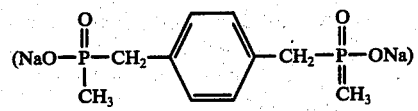

The product obtained with a yield of 416 g was non-flammable according to the ASTM D 635-68 test, as indicated in Table 1. RSV of the compression molded plate: 0.82 dl/g.

TABLE 1

| Ex. | Starting components of the polyamide | Flame proofing agent (FPA) | Added FPA wt. % | Compression molded plate RSV (dl/g) | Result acc. to ASTM D 635-68 |
|---|---|---|---|---|---|
| 1a | TA, BN, ε-caprolactam | disodium salt of ethane-1,2-dimethylphosphinic acid | 18.5 | 1.34 | non-flammable |
| 1b | TA, BN, ε-caprolactam | — | — | 1.47 | flammable |
| 2 | TA, 1,3-BAC, ε-caprolactam | disodium salt of ethane-1,2-dimethylphosphinic acid | 18.5 | 1.02 | non-flammable |
| 3a | TA/IA, 1,3-BAC, AH salt | zinc salt of dimethylphosphinic acid | 20.0 | 0.98 | non-flammable |
| 3b | TA/IA, 1,3-BAC AH salt | — | — | 1.10 | flammable |
| 4 | TA/IA, 1,3-BAC, AH salt | disodium salt of ethane-1,2-dimethyl-phosphinic acid | 20.4 | 0.88 | non-flammable |
| 5 | TA/IA, 1,3-BAC, AH salt | zinc salt of ethane-1,2-dimethylphosphinic acid | 20.0 | 0.92 | non-flammable |
| 6 | TA/IA, 1,3-BAC, AH salt | disodium salt of p-xylylene-dimethylphosphinic acid | 20.0 | 0.82 | non-flammable |

TA = terephthalic acid;
IA = isophthalic acid;
BN = bisaminomethylnorbornane mixture;
1,3-BAC = 1,3-bisaminomethylcyclohexane;
AH salt = adipic acid-hexamethylene diamine salt
RSV = reduced specific viscosity, measured on solutions of 1 g of polyamide in 100 ml of phenol/tetrachloroethane (60/40 weight %) at 25° C

What is claimed is:

1. A polyamide molding composition consisting essentially of a polyamide and a flameproofing amount of a flame-proofing agent which is a salt of a phosphinic acid of the formula

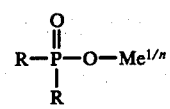

or a diphosphinic acid of the formula

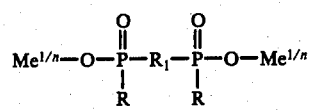

wherein
Me is selected from alkali metals and metals of the second and third groups of the Periodic System,
n indicates the valency of the metal Me, R is selected from saturated linear, branched and cyclic alkyl radicals having from 1 to 16 carbon atoms, aryl and aralkyl radicals having from 6 to 16 carbon atoms and mixtures thereof, and $R_1$ is selected from saturated linear, branched and cyclic alkylene; arylalkylene; arylene, arylenealkylene and arene-bisalkylene radicals having from 1 to 6 carbon atoms in the alkylene radical and mixtures thereof.

2. A polyamide molding composition as claimed in claim 1 containing a phosphinic acid salt of formula I or formula II in an amount of from 6 to 40 weight % based on the weight of the polymer.

3. A polyamide molding composition as claimed in claim 1 wherein the polyamide is an amorphous polyamide derived from a polyamine selected from 1,3- or 1,4-bis(aminomethyl)cyclohexane, 2,5- or 2,6-bis-(aminomethyl)-bicyclo[2,2,1]-heptane, dimethyl-bis(4-aminocyclohexyl)-methane, 2,2,4- and 2,4,4-trimethyl-hexamethylene-diamine and xylylene-diamine as the main diamine component.

4. A molding composition according to claim 1 wherein R is a linear, branched or cyclic alkyl radical of 1 to 6 carbon atoms and the alkylene radical of $R_1$ has 2 to 4 carbon atoms.

5. A molding composition according to claim 1 containing from 8% to 30% by weight of the flameproofing agent.

6. A polyamide molding composition consisting essentially of a polyamide and a flameproofing amount of a flame-proofing agent which is a salt of a phosphinic acid of the formula

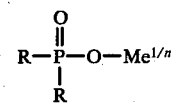

or a diphosphinic acid of the formula

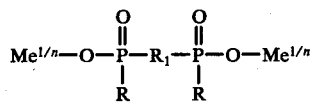

wherein

Me is a metal of the second group of the Periodic System, $n$ indicates the valency of the metal Me, R is selected from saturated linear, branched and cyclic alkyl radicals having from 1 to 16 carbon atoms, aryl and aralkyl radicals having from 6 to 16 carbon atoms and mixtures thereof, and $R_1$ is selected from saturated linear, branched and cyclic alkylene; arylalkylene; arylene, arylenealkylene and arenebisalkylene radicals having from 1 to 6 carbon atoms in the alkylene radical and mixtures thereof.

7. A polyamide molding composition according to claim 6 wherein Me is zinc.

* * * * *